US012587835B2

(12) United States Patent
Zhu

(10) Patent No.: US 12,587,835 B2
(45) Date of Patent: Mar. 24, 2026

(54) SECURITY FOR IoT PLATFORM BUILT ON A WIRELESS SENSOR NETWORK

(71) Applicant: Telefonaktiebolaget LM Ericsson (publ), Stockholm (SE)

(72) Inventor: Zhongwen Zhu, Quebec (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 322 days.

(21) Appl. No.: 18/559,215

(22) PCT Filed: Jun. 15, 2021

(86) PCT No.: PCT/IB2021/055279
§ 371 (c)(1),
(2) Date: Nov. 6, 2023

(87) PCT Pub. No.: WO2022/263884
PCT Pub. Date: Dec. 22, 2022

(65) Prior Publication Data
US 2024/0422531 A1 Dec. 19, 2024

(51) Int. Cl.
| | |
|---|---|
| *H04W 12/00* | (2021.01) |
| *H04L 9/40* | (2022.01) |
| *H04L 45/02* | (2022.01) |
| *H04W 12/121* | (2021.01) |
| *H04W 84/18* | (2009.01) |

(52) U.S. Cl.
CPC .......... *H04W 12/009* (2019.01); *H04L 45/02* (2013.01); *H04L 63/0236* (2013.01); *H04L 63/1425* (2013.01); *H04W 12/121* (2021.01); *H04W 84/18* (2013.01)

(58) Field of Classification Search
CPC .. H04W 12/009; H04W 12/121; H04L 45/02; H04L 63/0236; H04L 63/1425
See application file for complete search history.

(56) References Cited

FOREIGN PATENT DOCUMENTS

EP 3319369 A1 5/2018

OTHER PUBLICATIONS

Al-Karaki, et al., "Routing Techniques in Wireless Sensor Networks: A Survey", IEEE Wireless Communications, Dec. 2004, pp. 6-28.

(Continued)

*Primary Examiner* — Curtis B Odom
(74) *Attorney, Agent, or Firm* — Weisberg I.P. Law, P.A.

(57) ABSTRACT

Security protocols and techniques are provided to reduce security risks posed by anomaly traffic in a WSN. The WSN includes a WSN base station that communicates with one or more IoT servers over a 5G network or other backbone network. The WSN is managed by a WSN Central Office. The WSN base station monitors IoT traffic based on a detection model trained at a central office and detects the presence of anomaly traffic. Responsive to the detection of the anomaly traffic, the WSBS triggers a reconfiguration of the WSN to create a special path for the anomaly traffic to minimize the impact of the anomaly traffic on the WSN. Additionally, the central office can request the 5G network to update the NSI allocation to dedicate a network slice instance (NSI) for the anomaly traffic to segregate the anomaly traffic from the normal IoT traffic in the 5G network.

17 Claims, 18 Drawing Sheets

(56) References Cited

OTHER PUBLICATIONS

Minaei, et al., "Network Security: Artificial Intelligence method for Attack Detection (Survey Study)", Feb. 5, 2020, 3rd National Conference on Computer, information technology and applications of artificial intelligence, Shahid Chamran University of Ahvaz, pp. 1-12.

Sagha, H., et al., "On-line anomaly detection and resilience in classifier ensembles", Patter Recognition Letters 34 (2013) pp. 1916-1927.

Lee, C., et al., "SWAT: A Decentralized Self-healing Mechanism for Wormhole Attacks in Wireless Sensor Networks", World Scientific Review vol. 9.75in × 6.5 in, May 19, 2008, XP 55891767A, pp. 1-22.

Al-Karaki, J., et al., "Routing Techniques in Wireless Sensor Networks: A Survey*", IEEE Wireless Communications, vol. 11, Issue 6, pp. 1-37.

SECURITY FOR IoT PLATFORM BUILT ON A WIRELESS SENSOR NETWORK

TECHNICAL FIELD

The present disclosure relates generally to Internet-Of-Things (IoT) networks and, more particularly, to security for IoT networks including one or more Wireless Sensor Networks (WSNs).

BACKGROUND

An Internet-Of-Things (IoT) network typically comprises one or more Wireless Sensor Networks (WSNs) connected to a IoT service, which may be provided as a cloud service.

Connectivity between the IoT service and the WSNs can be provided by a Fifth Generation (5G) network. A WSN typically contains hundreds or thousands of sensor nodes. These sensors have the ability to communicate either among each other or directly to an external WSN base-station, commonly referred to as a sink. The WSN may comprise shared resources where the same WSN carries IoT data traffic for different IoT applications offered by different application providers/operators. The "shared resource concept" increases the usability of the WSN as well as the reach of the IoT applications by enabling the IoT network to cover larger geographic areas. Applications that have the similar Quality of Service (QOS) requirements can be grouped together so that the IoT data traffic for applications with the same or similar QoS travel through the same network slicing instance (NSI) offered in 5G networks. The management plane or control plane of the proposed IoT network is assigned to a dedicated NSI for both security reasons and to meet its own QoS requirement.

The IoT platform can be an open platform offered to different IoT application providers, IoT devices and users. The openness of the platform raises security concerns and increases risks to users of the platform.

SUMMARY

The present disclosure relates to security protocols and techniques to reduce security risks posed by anomaly traffic in a WSN. The WSN includes a WSN smart base station (WSBS) that communicates with one or more IoT servers over a 5G network or other backbone network. The WSBS monitors IoT traffic based on a detection model trained at a central office and detects the presence of anomaly traffic. Responsive to the detection of the anomaly traffic, the WSBS triggers a reconfiguration of the WSN to create a special path for the anomaly traffic to minimize the impact of the anomaly traffic on the WSN. Additionally, the central office can request the 5G network to update the NSI allocation to dedicate a network slice instance (NSI) for the anomaly traffic to segregate the anomaly traffic from the normal IoT traffic in the 5G network. The WSBS uses this dedicated NSI to forward the anomaly traffic to the IoT server. In some embodiments, the 5G network may provide firewall services with varying degrees of packet inspection. In this case, the WSBS can use a classification model to classify packets according to the risk level and select a firewall service based on the risk level of the anomaly traffic. If it is determined that the anomaly traffic does not pose a risk, the WSN can be reconfigured to remove the special path created for the anomaly traffic. If the anomaly traffic is determined to be a danger, the WSN can be instructed to reject the anomaly traffic and the special path can be removed.

A first aspect of the disclosure comprises a method implemented by a network node in a WSN of reducing security risks responsive to the detection of the anomaly traffic in the WSN. In one embodiment, the method comprises receiving data traffic from client devices collected by one or more network nodes of the WSN, detecting anomaly traffic in the received data traffic and, responsive to the detection of the anomaly traffic, triggering a topology reconfiguration of the WSN to configure one or more predefined paths through the WSN from the source or sources of the anomaly traffic to the network node.

A second aspect of the disclosure comprises a network node in a WSN configured to reduce security risks responsive to detection of anomaly traffic in the WSN. In one embodiment, the network node is configured to receive data traffic from client devices collected by one or more network nodes of the WSN, detect anomaly traffic in the received data traffic and, responsive to the detection of the anomaly traffic, trigger a topology reconfiguration of the WSN to configure one or more predefined paths through the WSN from the source or sources of the anomaly traffic to the network node.

A third aspect of the disclosure comprises a network node in a WSN configured to reduce security risks responsive to detection of anomaly traffic in the WSN. In one embodiment, the network node comprises communication circuitry for communicating with other network nodes and processing circuitry. The processing circuitry is configured to receive data traffic from client devices collected by one or more network nodes of the WSN, detect anomaly traffic in the received data traffic and, responsive to the detection of the anomaly traffic, trigger a topology reconfiguration of the WSN to configure one or more predefined paths through the WSN from the source or sources of the anomaly traffic to the network node.

A fourth aspect of the disclosure comprises a computer program comprising executable instructions that, when executed by a processing circuitry in a network node, causes the network node to perform the method according to the first aspect.

A fifth aspect of the disclosure comprises a carrier containing a computer program according to the fourth aspect, wherein the carrier is one of an electronic signal, optical signal, radio signal, or computer readable storage medium.

A sixth aspect of the disclosure comprises methods implemented by a network node in a WSN of forwarding data traffic collected by client devices toward an Internet of Things (IoT) server over a backbone network. In one embodiment, the method comprises receiving IoT data traffic collected by one or more network nodes of the WSN, detecting anomaly traffic in the received IoT data traffic and, responsive to the detection of the anomaly traffic, forwarding the anomaly traffic towards the IoT server over a network slice instance in the backbone network provisioned for the anomaly traffic.

A seventh aspect of the disclosure comprises a network node in a WSN configured to forward data traffic collected by client devices toward an Internet of Things (IoT) server over a backbone network. In one embodiment, the network node is configured to receive IoT data traffic collected by one or more network nodes of the WSN, detect anomaly traffic in the received IoT data traffic and, responsive to the detection of the anomaly traffic, forward the anomaly traffic towards the IoT server over a first network slice instance in the backbone network provisioned for the anomaly traffic.

An eighth aspect of the disclosure comprises a network node in a WSN configured to forward data traffic collected by client devices toward an Internet of Things (IoT) server over a backbone network. In one embodiment, the network node comprises communication circuitry for communicating with other network nodes and processing circuitry. The processing circuitry is configured to receive IoT data traffic collected by one or more network nodes of the WSN, detect anomaly traffic in the received IoT data traffic and, responsive to the detection of the anomaly traffic, forward the anomaly traffic towards the IoT server over a first network slice instance in the backbone network provisioned for the anomaly traffic.

A ninth aspect of the disclosure comprises a computer program comprising executable instructions that, when executed by a processing circuitry in a network node, causes the network node to perform the method according to the sixth aspect.

A tenth aspect of the disclosure comprises a carrier containing a computer program according to the ninth aspect, wherein the carrier is one of an electronic signal, optical signal, radio signal, or computer readable storage medium.

An eleventh aspect of the disclosure comprises methods implemented by a network node in a WSN of allocating resources in a backbone network for IoT traffic. In one embodiment, the method comprises aggregating reports from one or more WSNs in the IoT network of anomaly data traffic originating from client devices in the one or more WSNs to obtain aggregated anomaly data for analysis. The method further comprises determining, based on the aggregated anomaly data, a network slice instance (NSI) configuration for the IoT data traffic. The method further comprises sending a request to the backbone network to update a NSI allocation for IoT data traffic according to the NSI configuration.

A twelfth aspect of the disclosure comprises a network node in a WSN configured to allocate network resources in a backbone network for IoT traffic. The network node is configured to aggregate reports from one or more WSNs in the IoT network of anomaly data traffic originating from client devices in the one or more WSNs to obtain aggregated anomaly data for analysis. The network node is further configured to determine, based on the aggregated anomaly data, a network slice instance (NSI) configuration for the IoT data traffic. The network node is further configured to send a request to the backbone network to update a NSI allocation for IoT data traffic according to the NSI configuration.

A thirteenth aspect of the disclosure comprises a network node in a WSN configured to allocate network resources in a backbone network for IoT traffic. In one embodiment, the network node comprises communication circuitry for communicating with other network nodes and processing circuitry. The processing circuitry is configured to aggregate reports from one or more WSNs in the IoT network of anomaly data traffic originating from client devices in the one or more WSNs to obtain aggregated anomaly data for analysis. The processing circuitry is further configured to determine, based on the aggregated anomaly data, a network slice instance (NSI) configuration for the IoT data traffic. The processing circuitry is further configured to send a request to the backbone network to update a NSI allocation for IoT data traffic according to the NSI configuration.

A fourteenth aspect of the disclosure comprises a computer program comprising executable instructions that, when executed by a processing circuitry in a network node, causes the network node to perform the method according to the eleventh aspect.

A fifteenth aspect of the disclosure comprises a carrier containing a computer program according to the fourteenth aspect, wherein the carrier is one of an electronic signal, optical signal, radio signal, or computer readable storage medium.

DETAILED DESCRIPTION

Figure 1:
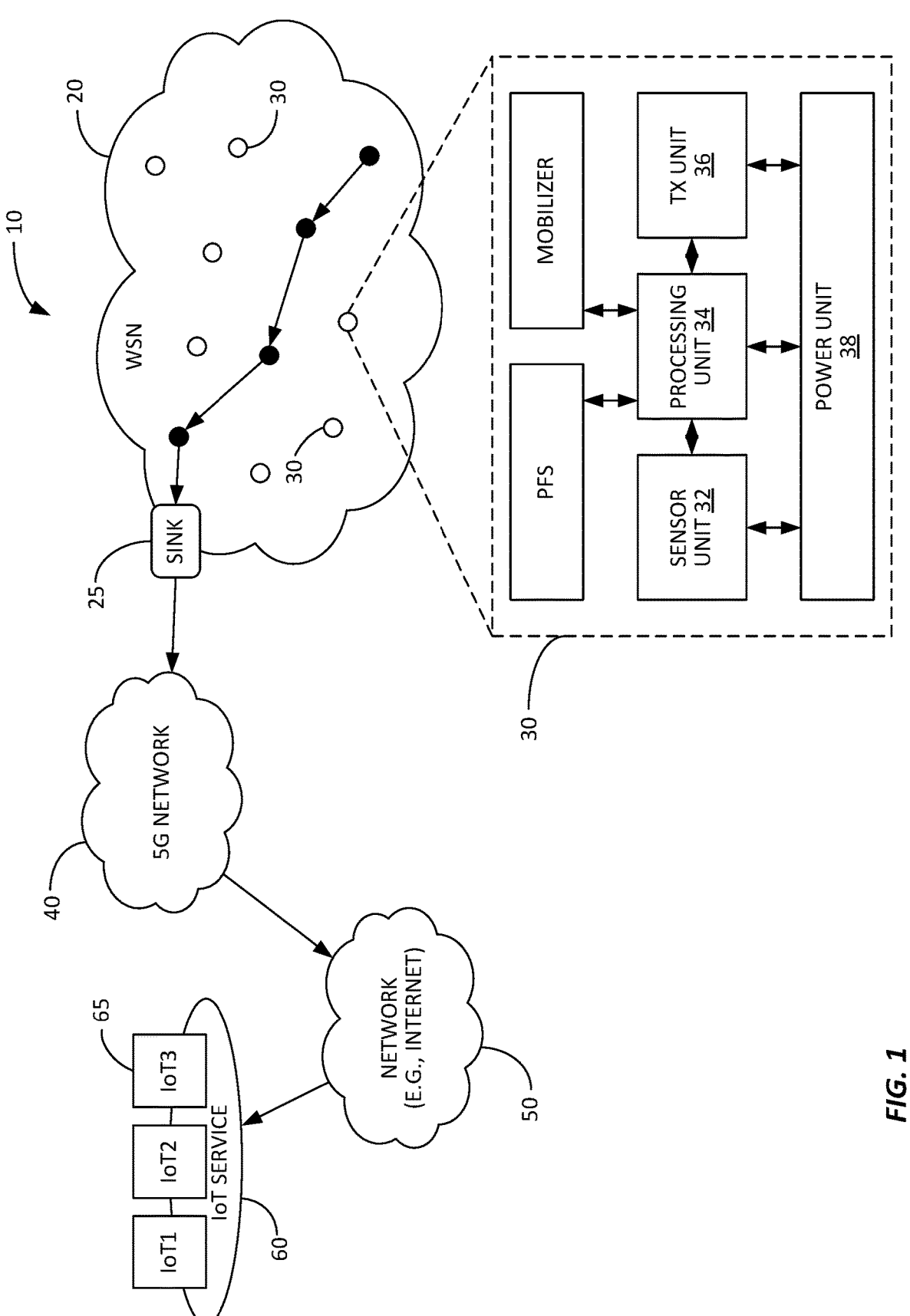
FIG. 1 illustrates an exemplary IoT network and sensor node configured for low energy consumption.

Referring now to the drawings, and particularly to FIG. 1, an exemplary deployment of a IoT network is shown. The IoT network 10 comprises a IoT service 60 providing one or more IoT applications 65 and one or more WSNs 20 connected to the IoT service 60 over a 5G wireless communication network 40, which provides connectivity between the IoT service 60 and WSNs 20. In some embodiments, the 5G network 40 may connect with the IoT service 60 over an external packet data network (PDN) 50, such as the Internet. The external PDN 50 may comprise a dedicated/backbone network or a public network, such as the Internet. In other embodiments, the 5G network 40 may connect with the IoT service 60 directly through its own backbone network.

The IoT service 60 is provided by one or more IoT servers, which may comprise dedicated servers, or may be implemented as a cloud service. The IoT servers comprise application servers implementing the IoT applications 65. The WSNs 20 comprises a network of energy efficient sensor nodes 30 and may contain hundreds or thousands of sensor nodes 30. The sensor nodes 30 have the ability to communicate with one another and with a WSN base station 25, which is commonly referred to a sink. The WSN base station 25 provides connectivity with the 5G network to enable communication between the WSN 20 and IoT service 60.

FIG. 1 also illustrates an exemplary sensor node 30 configured for low energy consumption. The sensor node 30 comprises four main components: a sensor unit 32, a processing unit 34, a transmission (TX) unit 36 and a power unit 38. In some embodiments, the sensor node 30 may additionally include a position finding system (PFS) and a mobilizer. The sensing unit 32 comprises one or more sensors for collecting data and an analog-to-digital converter (ADC) for converting the data to digital form. The processing unit 34 processes the digitized sensor data and controls the operation of the sensor node 30. The transmission unit 36 typically comprises a radio frequency (RF) transceiver configured to communicate with other sensor nodes 30 or directly with the WSN base station/sink 25. The power unit 38 comprises a power source (e.g., a battery) and related power circuitry for providing power to the sensor unit 32, processing unit 34 and transmission unit 36. The energy capacity for different sensor nodes my be different.

In order to achieve an efficient, scalable and reliable WSN 20, a hierarchical or cluster-based architecture can be used. With cluster-based architectures, higher energy sensor nodes 30 can be used to process and send information while low energy sensor nodes 30 in the proximity of the targets can be used to perform the sensing.

Two commonly used clustering protocols for WSNs 20 is the Low Energy Adaptive Clustering Hierarchy (LEACH) protocol and Threshold-Sensitive Energy Efficient Sensor Network (TEEN). The LEACH protocol randomly selects a few nodes as cluster heads (CHs) and rotates this role over time to evenly distribute the energy load among the nodes in the network. In LEACH, the cluster head (CH) nodes compress data arriving from nodes that belong to the respective cluster and send an aggregated packet to the base station/sink in order to reduce the amount of information that must be transmitted to the base station. LEACH uses Time Division Multiple Access (TDMA) and/or Code Division Multiple Access (CDMA) TDMA/CDMA for Medium Access Control (MAC) to reduce inter-cluster and intra-cluster collisions. However, data collection is centralized and is performed periodically.

For mission critical applications, the WSN 20 may use the Threshold-sensitive Energy Efficient sensor Network (TEEN) protocol and Adaptive Periodic TEEN (APTEEN) protocols to overcome the latency problem in LEACH. In TEEN/APTEEN, nodes sense the medium continuously, but data transmission is less frequent. A CH node sends its members a hard threshold, which is the threshold value of the sensed attribute, and a soft threshold, which is a small change in the value of the sensed attribute that triggers the node to switch on its transmitter and transmit. The hard threshold reduces the number of transmissions by allowing the nodes to transmit only when the sensed attribute is in the range of interest. The soft threshold further reduces the number of transmissions that might have otherwise occurred when there is little or no change in the sensed attribute. A smaller value of the soft threshold gives a more accurate picture of the network, at the expense of increased energy consumption. Thus, the user can control the trade-off between energy efficiency and data accuracy. When cluster-heads are to change, new values for the above parameters are broadcast.

These cluster-based WSN architectures are getting more attractive while many IoT applications are designed, developed and deployed in the network to change our lifestyle in this digitalizing world.

Figure 2:
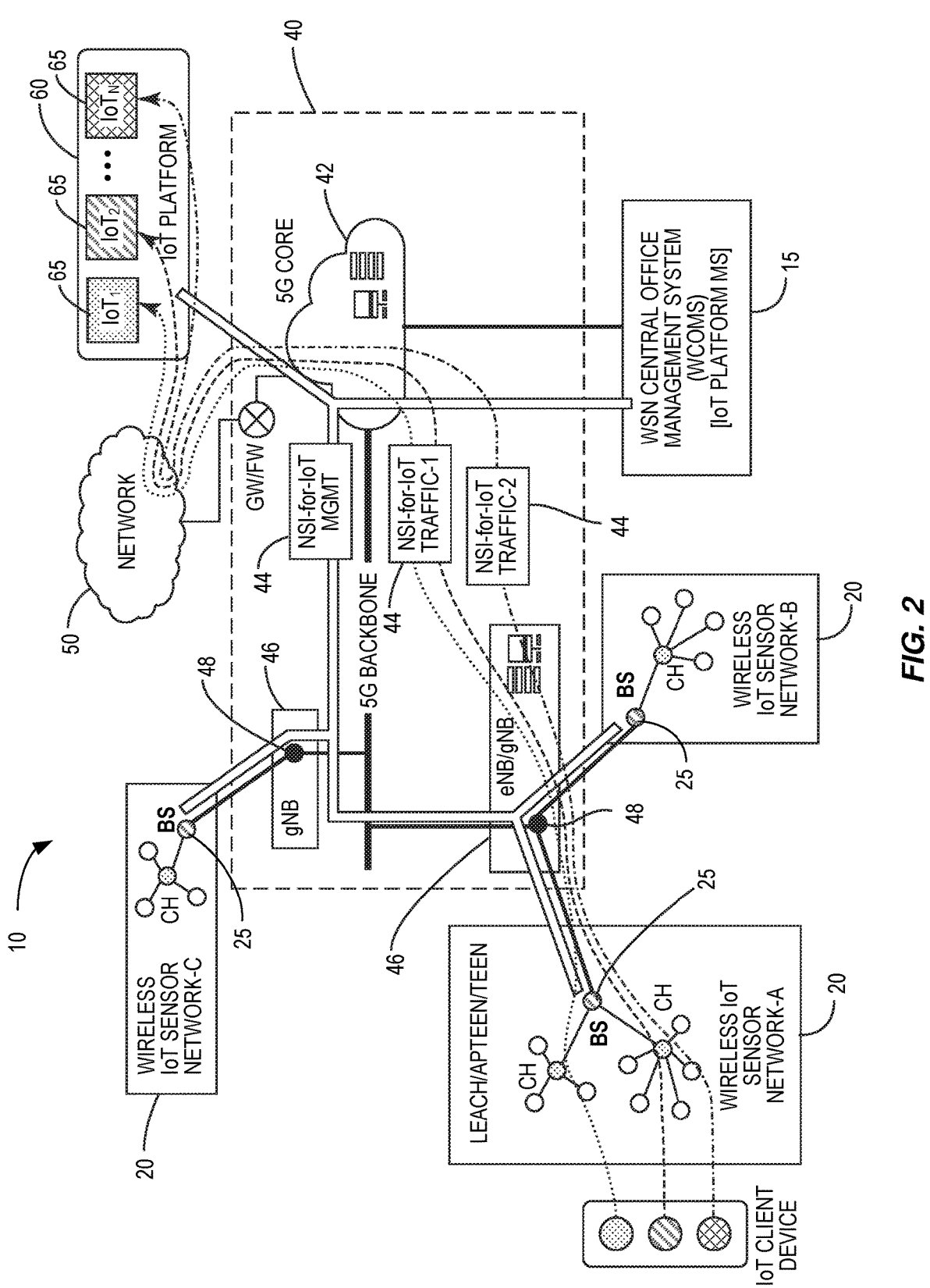
FIG. 2 is a more detailed view of an IoT network deployed over a 5G network.

FIG. 2 is a more detailed view of an IoT network 10 deployed over a 5G network. For convenience, similar reference numbers are used in the drawings to indicate similar components. The IoT network 10 comprises a plurality of WSNs 20, a WSN Central Office Management System (WCOMS) 15 that manages the WSNs 20, and an IoT service 60. FIG. 2 illustrates three WSNs 20 denoted respectively as WSN-A, WSN-B and WSN-C. In this simplified diagram, WSN-A comprises two clusters of sensor nodes 30 with the CH for each cluster communicating with the WSN base station 25 for the WSN 20. WSN-B and WSN-C include one cluster each. Each cluster connects to the IoT service 60 over a 5G network 40.

The 5G network 40 provides connectivity between WSNs 20, the WCOMS 15 and the IoT service 60. The 5G network 40 comprises one or more Radio Access Networks (RANs) 46 and a 5G core (5GC) network 42. Each RAN 46 comprises one or more base stations 48, commonly referred to as 5G Node Base station (gNBs) or Evolved NodeBs (eNBs), providing connection to the 5GC 42. The 5GC 42 provides one or more Network Slice Instances (NSIs) 44 for IoT traffic. The 5GC 42 provides connection to external Wide Area Networks (WANs), such as the Internet 50. The WANs my be public or private networks.

FIG. 2 illustrates three IoT data flows for three different IoT applications 65 denoted as $IoT_1$-$IoT_3$. In this example, the 5G network 40 provides two NSIs for IoT traffic providing different QoS. The data flows for $IoT_1$ and $IoT_2$ reach the WSBS 25 via different CHs and are assigned to a first Network Slice Instance NSI 44 in the 5G network 40. The data flow for $IoT_3$ is assigned to a second NSI 44 instance.

Typically, the IoT network 10 is deployed outside the 5G network 40 and the 5G network 40 provides connectivity between the various components of the IoT network 10. The WSN 20 may comprise shared resources where the same WSN 20 carries IoT data traffic for different IoT applications 65 offered by different application providers/operators. The "shared resource concept" increases the usability of the WSN 20 as well as the reach of the IoT applications 65 by enabling the IoT network 10 to cover larger geographic areas. IoT applications 65 that have the similar Quality of Service (QOS) requirements can be grouped together so that the IoT data traffic for applications with the same or similar QoS travel through the same NSI 44 offered in 5G networks 40 as shown in FIG. 2. The management plane or control plane of the proposed IoT WCOMS is assigned to a dedicated NSI 44 for both security reasons and to meet its own QoS requirement.

The IoT network 10 can be an open platform offered to different IoT application providers, IoT devices and users. The openness of the platform raises security concerns and increase risks to users of the platform.

One aspect of the present disclosure is to provide a security solution for IoT networks 10 to reduce the security risks, particularly for open IoT networks 10. Artificial intelligence/machine learning (AI/ML) based detection, classification and prediction algorithms are introduced to detect and classify anomalous data packets and to predict future attacks and security risks. These new AI/ML features work together with the 5G network slicing technology and a firewall (FW) or virtual firewall (vFW) provided by the 5G network operator, or by other security providers through the 5G network. The FW/vFW may comprise Firewall as a Service (FWaaS) 45.

Figure 3:
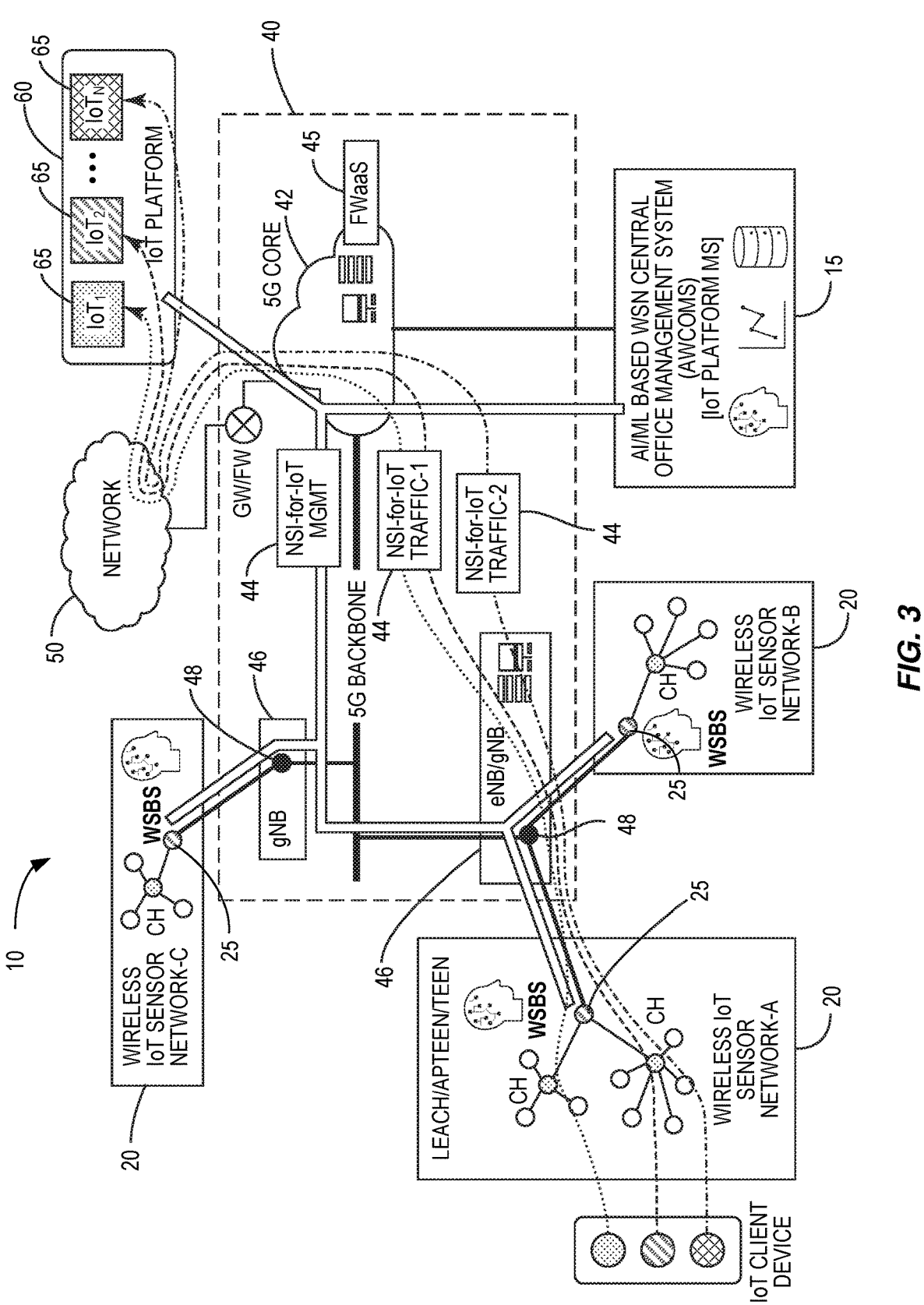
FIG. 3 provides a high-level view of an IoT network including the new AI/ML features for detection, classification and prediction.

FIG. 3 illustrates an embodiment of the security solution for an IoT network 10 including the new AI/ML features for detection, classification and prediction. The three main features of the security solution comprise a smart base station/sink (WSBS) 25 in the WSN 20, a AI/ML based WCOMS (AWCOMS) 15, and the FWaaS 45 provided by the 5G network 40 operator or other service provider.

The WSBS 25 uses an AI/ML model to detect anomaly packets or data traffic pattern appearing in the WSN 20. When the potential security risk is identified, the WSBS 25 adapts its network topology to reduce the impact of the anomaly packet traffic within the WSN 20 automatically. The adaptation of network topology maximizes the efficiency of network communication and minimizes the impact of the anomaly data traffic based on the AI/ML model and forwards the anomaly data packet to corresponding firewall services located in operator 5G network.

The AWCOMS 15 collects all the security and anomaly detection information from each WSN 20 via WSBS 25 across different locations within the same IoT platform. Based on the collected data, the AWCOMS 15 trains the models to detect anomaly traffic and classify the network security risk levels, as well as the model to predict potential security attacks at certain locations. The AWCOMS 15 is configured to push or deliver those trained AI/ML models to the WSBS 25 at different locations.

Figure 4:
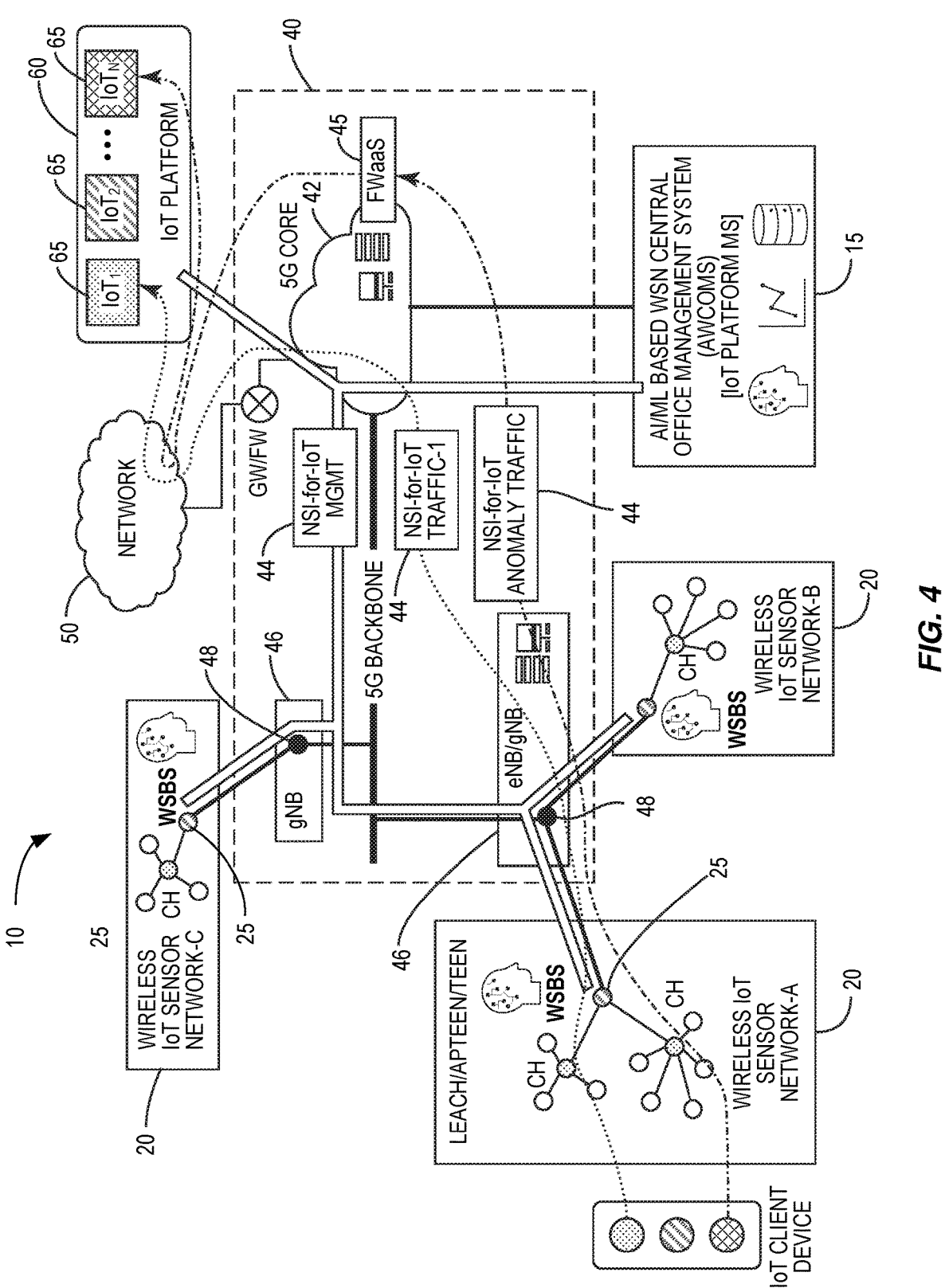
FIG. 4 provides a high-level view of an IoT network illustrating anomaly traffic flow.

The WSBS 25 and AWCOMS 15 work in conjunction with the network slicing technology and FWaaS 45 provided by the 5G network 40 operator. As shown in FIG. 4, the AWCOMS 15 assigns the detected anomaly data traffic to a specific NSI 44 to reduce the impact of anomaly data traffic on other IoT data traffic. At the same time, the WSBSs 25 classifies packets based on the AI/ML model provided by the AWCOMS 15 and forwards the anomaly data packets to a selected FW service based on the classification of those anomaly data flows.

As shown in FIG. 3, the end-to-end data traffic from IoT client devices to the IoT server passes through a sensor node 30, CH and WSBS 25. The IoT data traffic then enters 5G network 40 and obtains QoS service using a dedicated NSI 44 for the IoT traffic and eventually arrives at the corresponding IoT server. As noted previously, data traffic for multiple IoT applications can be assigned to the same NSI. In the example shown in FIG. 3, data flows for IoT application 1 (IoT$_1$) and IoT application 2 (IoT$_2$) are assigned to a first NSI denoted NSI1 and the data flow for IoT$_N$ is assigned to a second NSI denoted NSI$_2$.

When anomaly IoT data traffic is detected in the WSN, the WSBS 25 adapts its WSN 20 topology and redirect the anomaly IoT data flow to a selected FW in 5G network 40 as shown in FIG. 4. The anomaly traffic is assigned to a dedicated NSI 44 for IoT anomaly traffic to segregate the anomaly traffic from other IoT data traffic in the 5G network. The dedicated NSI 44 for anomaly traffic can handle anomaly IoT data packets from different local WSNs 20.

Figures 5A, 5B:
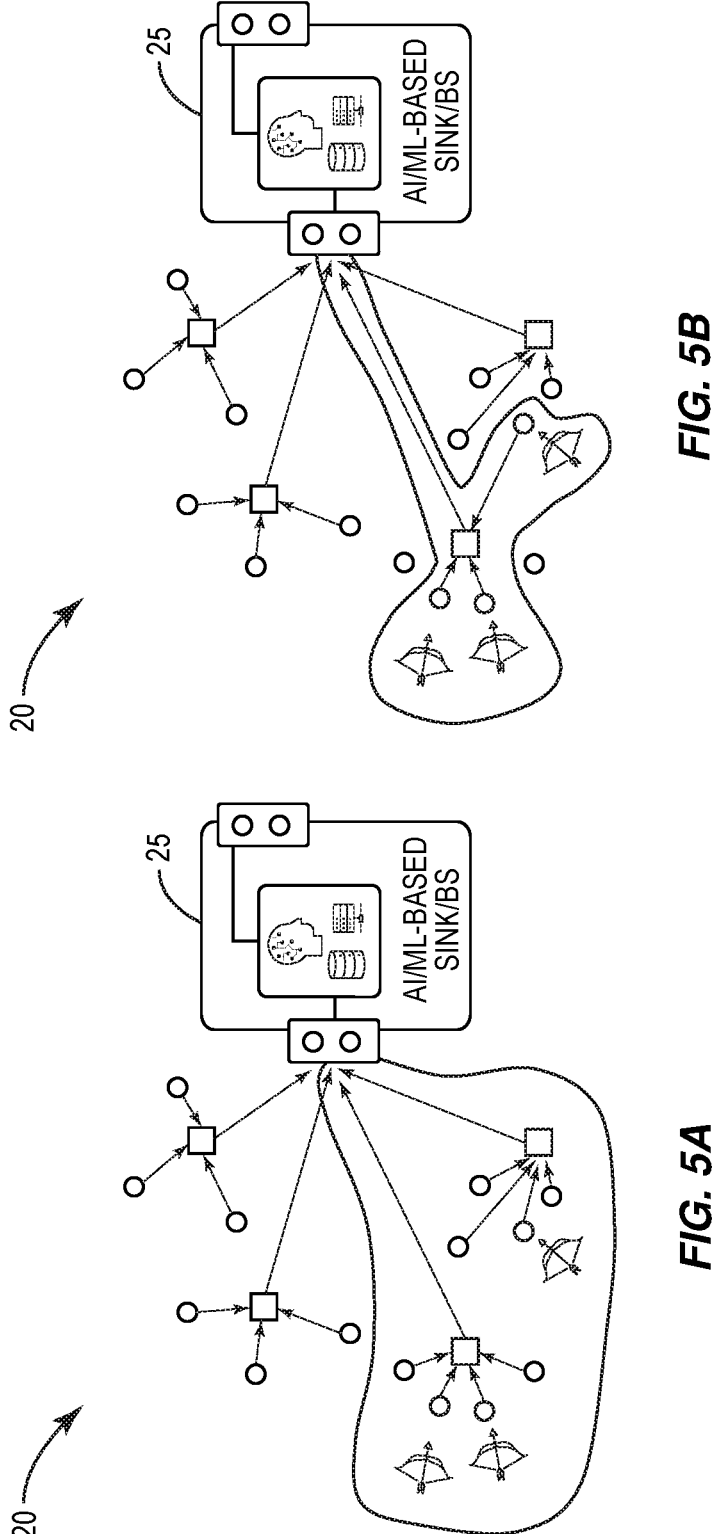
FIGS. 5A and 5B illustrate one example of the adaptation of the WSN topology.

FIGS. 5A and 5B illustrate one example of the adaptation of the WSN 20 topology. FIG. 5A illustrates the topology of the WSN 20 when the anomaly traffic appears. In this example, the anomaly traffic originates at three sensor nodes 30 in two different clusters. The WSBS 25 reconfigures the WSN 20 to separate the anomaly traffic and direct the anomaly traffic through a single CH. In this example, the sensor nodes 30 from which the anomaly traffic originates, referred to herein as the source nodes, are assigned to a single cluster so that the anomaly traffic passes through only one CH. Adapting the network topology of the WSN 20 reduces the footprint of the anomaly data within the IoT network 10 and reduces the security risks. The configuration at each network element (e.g. sensor node 30 and CH) for WSN 20 topology adaptation is made by WSBS 25 using the AI/ML based algorithm to optimize a cost function, which maximizes the efficiency of network communication and minimizes the impact of the anomaly data traffic.

Figure 6:
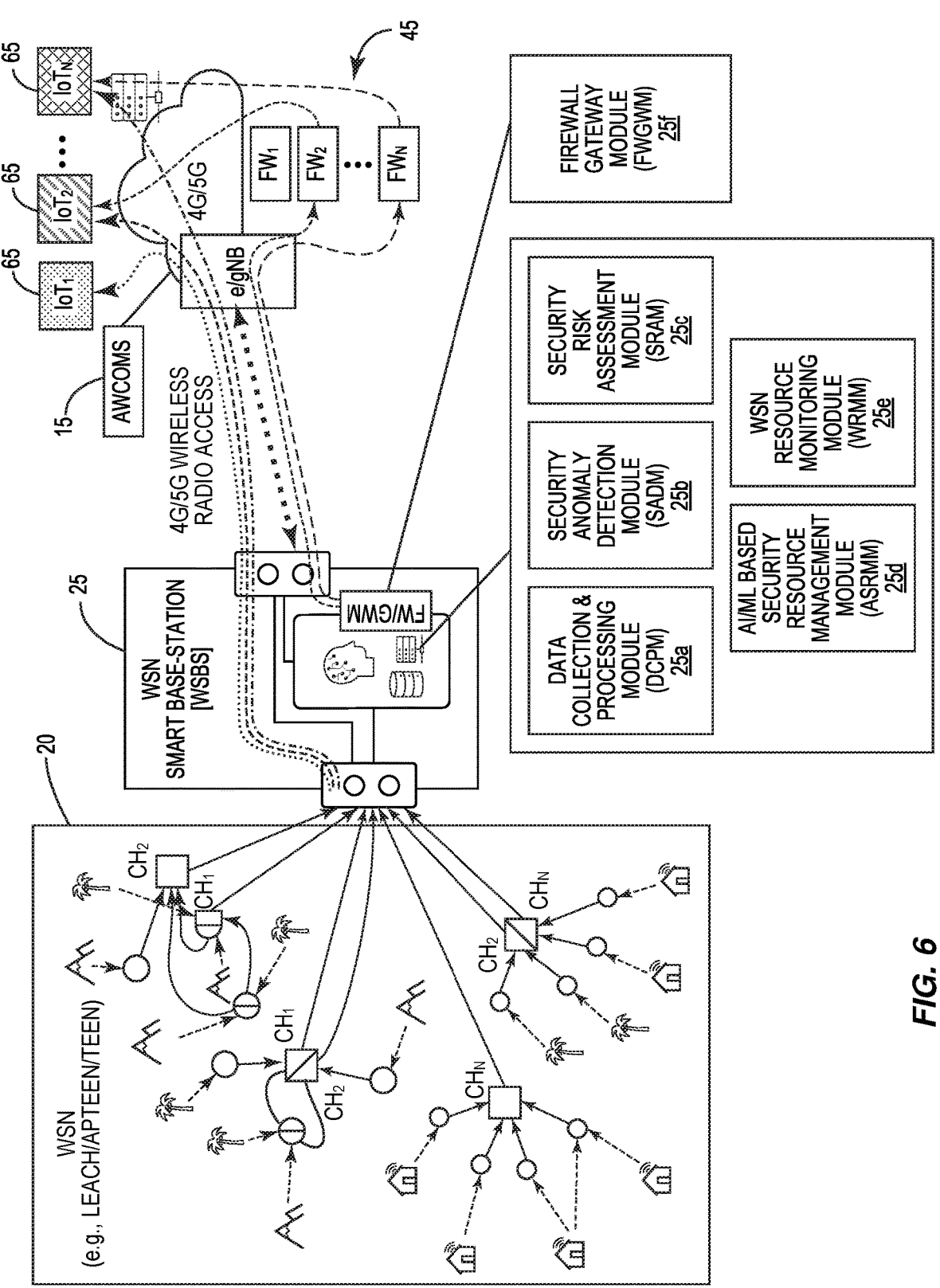
FIG. 6 also illustrates six components of the WSBS according to one exemplary implementation.

FIG. 6 is another view of the IoT network 10 illustrating the WSN 20 and WSBS 25 in more detail. The WSN 20 is a cluster-based network implementing a cluster-based, hierarchical protocol such as LEACH, TEEN or APTEEN. Only one WSN 20 is shown although the IoT network 10 may include numerous WSNs 20 spread to cover a wide geographic area. Each WSN 20 includes a plurality of sensor nodes 30 including CHs and a WSBS 25. The WSBS 25 is the entry point to the 5G network 40 for IoT traffic originating in the WSN 20.

The WSBS 25 implements an AI/ML based anomaly detection model and adapts WSN 20 topology dynamically to reduce the impact of anomaly data traffic in the WSN 20 responsive to the detection of anomaly traffic. The WSBS 25 selects a FWaaS 45 for anomaly traffic based on a AI/ML based classification model and forwards the anomaly traffic to a selected FWaaS 45 provided by the 5G network 40 operator. The WSBS 25 communicates the outcome of anomaly detections as well as the retrieved features to the AWCOMS 15, receives trained detection, classification and predication models from AWCOMS 15 and updates the local models accordingly. The WSBS 25 also monitors the network elements (such as sensor node, CH, etc.) and optimizes the usage of these network elements.

The AWCOMS 15 collects all the features retrieved by the AI/ML models running in each WSN 20, trains the models for detection, classification and prediction in the AWCOMS 15, and delivers the trained detection and classification models to the WSBSs 25 deployed in different WSNs 20. The AWCOMS 15 also assigns the NSI to anomaly data packet flow to reduce the security risk for normal IoT traffic.

The FWaaS 45 provides the data packet inspection and data traffic pattern recognition service. Multiple FWaaS 45 with different services and features can be provided at different locations.

FIG. 6 also illustrates six components of the WSBS 25 according to one exemplary implementation. The WSBS 25 comprises a Data Collection and Processing Module (DCPM) 25a, a Security Anomlay Detection Module (SADM) 25b, a Security Risk Assessment Module (SRAM) 25c, a AI/ML based Security Resource Management Module (ASRMM) 25d, a WSN 20 Resourcing Monitoring Module (WRMM) 25e and a Firewall Gateway Module (FWGWM) 25f. The DCPM 25a receives IoT traffic from all CHs in the WSN 20 and processes (e.g., copy, forward, proxy, etc.) the received IoT data traffic. The SADM 25b detects the anomaly data packets using a AI/ML detection model, which is trained by the AWCOMS 15. The SRAM 25c is responsible for assessing the security risk level for the identified anomaly traffic based on an AI/ML classification model, which is trained by the AWCOMS 15. The ASRMM 25d is responsible for managing all the network elements within WSN 20. The WRMM 25e is responsible for monitoring all the network elements, such as sensor nodes, CHs, etc. The FWGWM 25*f* is for locating the correct FW function/services offered in operator's network for the anomaly traffic detected in WSN. The FWGWM sends the data to the FW that is selected for the anomaly IoT traffic (e.g., FW for Deep Packet Inspection (DPI)).

Figure 7A:
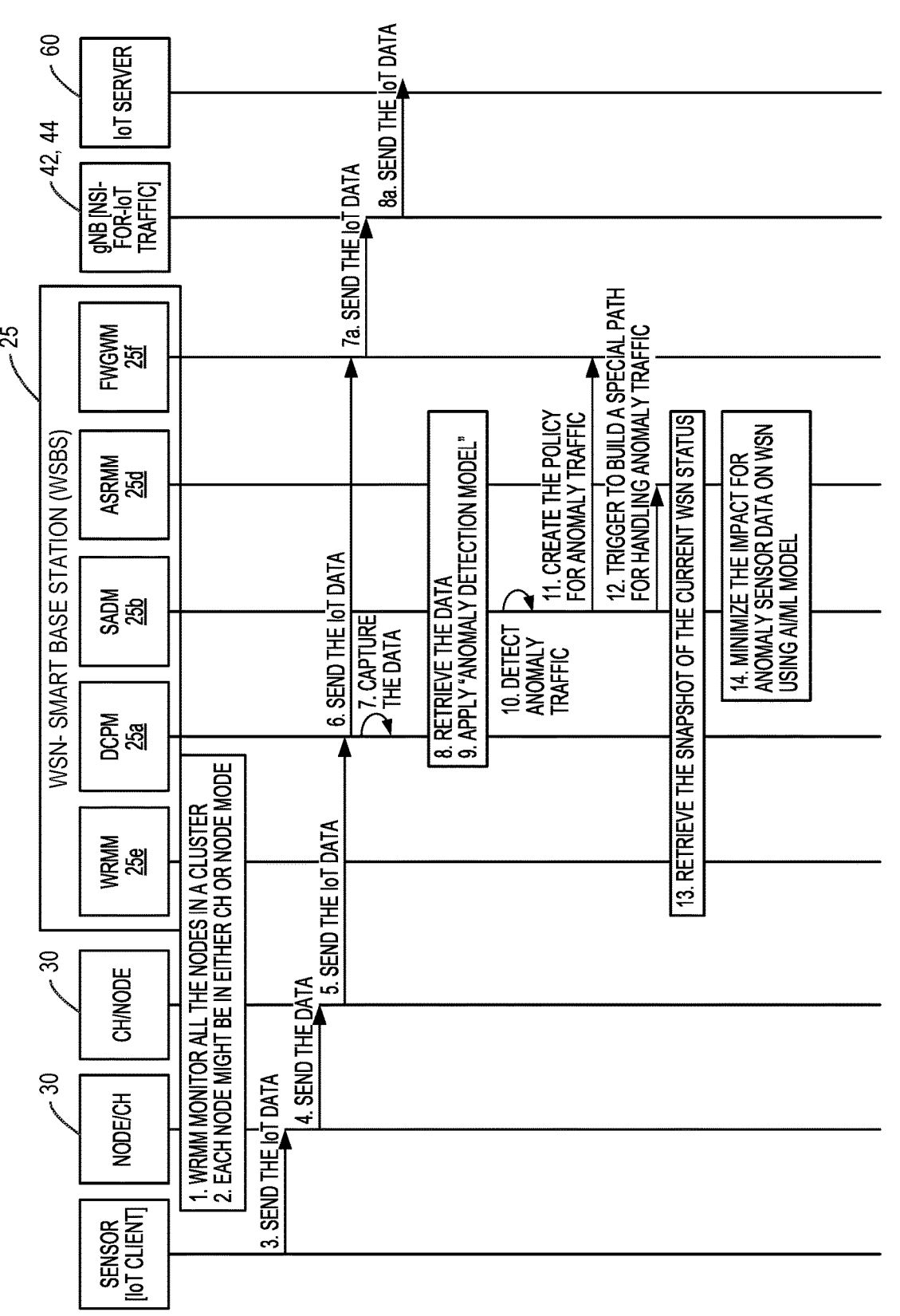
FIGS. 7A and 7B illustrate exemplary signaling between components of the IoT network triggered by anomaly data traffic.
Figure 7B:
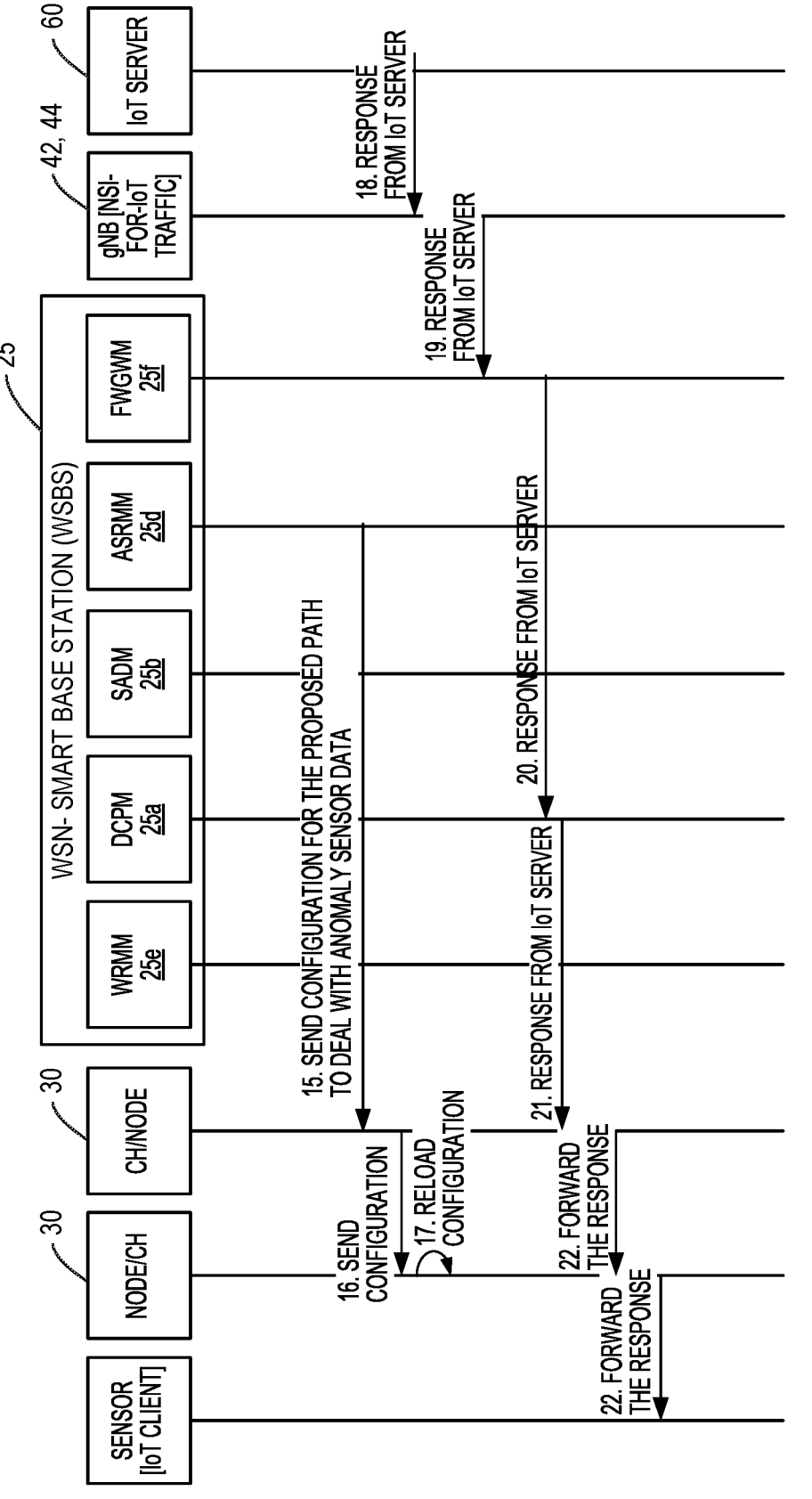

FIGS. 7A and 7B illustrate exemplary signaling between components of the IoT network 10 triggered by anomaly data traffic. The WRMM 25*e* monitors the status of all nodes in the WSN 20, which can be in CH mode or Node mode (1, 2). A sensor node 30 in Node mode can receive data from an IoT client or another sensor node 30 in Node mode and forward the traffic to another sensor node 30 in either Node Mode or CH mode. In this example a sensor functioning as an IoT client sends its data to a sensor node 30 in Node mode, which forwards the data to a CH node (3, 4). The CH node aggregates data received from multiple sensor nodes 30 in its assigned cluster and forwards the data to the WSBS 25 (5). At the WSBS 25, the DCPM 25*a* samples the data traffic traversing the WSBS 25 and forwards the data traffic to the FWGWM 25*f* (6), which in turn forwards the data traffic via the 5G network to the IoT server (7*a*, 8*a*).

The data traffic sampled by the DCPM 25*a* is captured and temporarily stored for analysis by the SADM 25*b* (7). The SADM 25*b* retrieves the stored data and applies the anomaly detection model trained by the AWCOMS 15 to detect anomaly traffic (8, 9). If anomaly traffic is detected, the ASRMM 25*d* creates a policy for the anomaly traffic to create a special path to the 5G network 40 (10,11). The policy is used by the FWGWM 25*f* to determine the FWaaS 45 to be applied to the anomaly traffic. Once the new policy is implemented, the FWGWM 25*f* locates a FWaaS 45 based on the classification model and begins forwarding the anomaly traffic to the selected FWaaS 45. Additionally, the detection of the anomaly traffic triggers the ASRMM 25*d* to rearrange or reconfigure the network topology of the WSN 20 to isolate the anomaly traffic (12-17). The ASRMM 25*d* retrieves a snapshot of the current WSN 20 topology and applies a cost function to determine a new network topology that maximizes the efficiency of network communication and minimizes the impact of the anomaly data traffic (14). The ASRMM 25*d* sends the new network configuration to each CH node, which forwards the configuration to downstream sensor nodes 30 (15, 16). Each sensor node 30 loads the new configuration (17).

Upon receiving data from the WSN 20, the IoT application 65 may send a response back through the 5G network 40 (18). The response is transmitted by the 5G base station 48 to the WSBS 25 (19). The FWGWM 25*f* at the WSBS 25 forwards the data to the DCPM 25*a* (20). The DCPM 25*a* sends the response to the CH node, which forwards the response via one or more downstream sensor nodes 30 to the IoT client (21-23).

Figure 8:
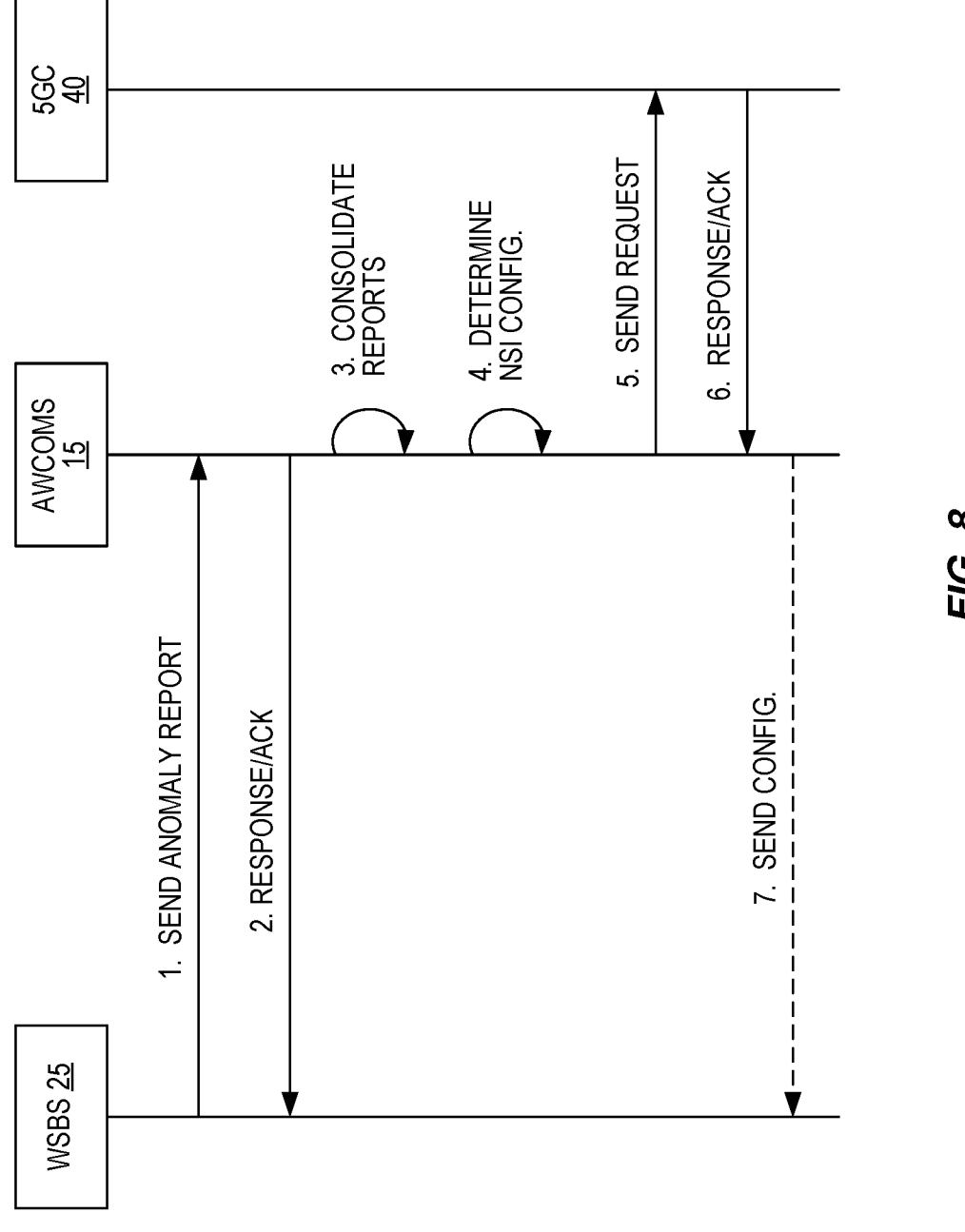
FIG. 8 illustrates signaling to establish a special path through the 5G network for anomaly traffic.

FIG. 8 illustrates signaling to establish a special path through the 5G network 40 for anomaly traffic. When anomaly data traffic is detected, the WSBS 25 sends a report of the anomaly data traffic to the AWCOMS 15 and the AWCOMS 15 answers with an acknowledgement of the report (1, 2). The AWCOMS 15 consolidates the reports from different WSNs 20 being managed by the AWCOMS 15 and determines a NSI 44 strategy to minimize the impact of the anomaly traffic (3, 4). In some embodiments, the AWCOMS 15 may use a AI/ML model to determine the best strategy. Once the NSI 44 strategy is determined, the AWCOMS 15 sends a request to the 5GC using procedures standardized by 3GPP to update the NSI 44 allocation for the IoT network (5). If the request is accepted, the 5GC 42 responds to acknowledge the request and adds and/or removes IoT traffic from one or more NSIs 44 to segregate the anomaly traffic in a dedicated NSI 44 for the anomaly traffic (6). The NSI 44 allocation is propagated back to the WSN 20 through the system information transmitted by the 5G base station to the WSBS 25. Alternatively, or in addition, the NSI 44 allocation could be sent back to the AWCOMS 15 and propagated back to the WSBSs 25 by the AWCOMS 15 via control plane signaling between the WSBSs 25 and the AWCOMS 15 (7).

Figure 9:
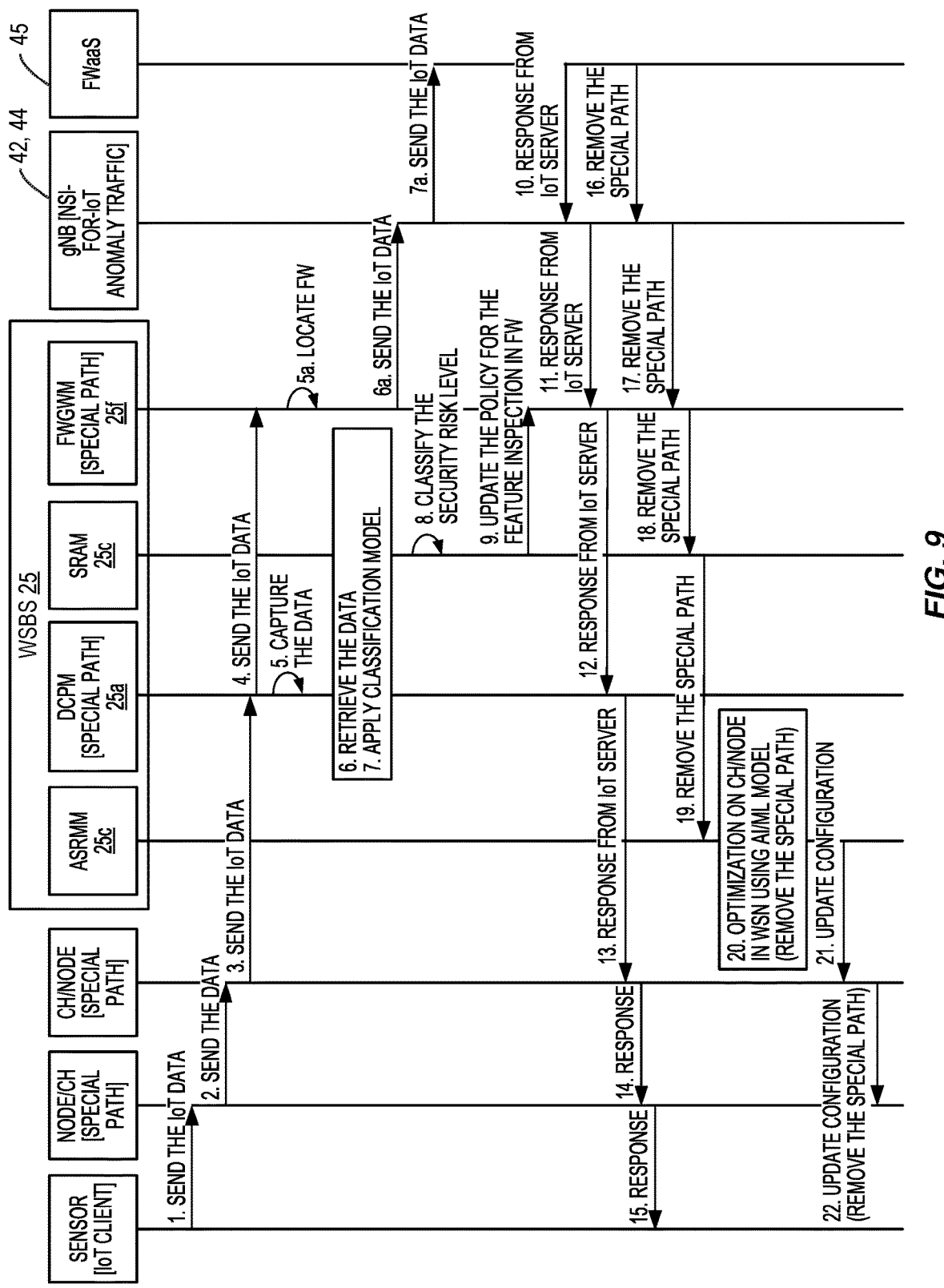
FIG. 9 illustrates the clearing of a special path created for anomaly traffic.

FIG. 9 illustrates the clearing of a special path created for anomaly traffic. In this example, anomaly traffic originating at a sensor node 30 functioning as an IoT client sends its data to a sensor node 30 in Node mode, which forwards the data to a CH node (1, 2). In this case, the anomaly traffic follows a special path created by the WSBS 25 for the anomaly traffic. The CH node forwards the anomaly traffic to the WSBS 25 (3). At the WSBS 25, the DCPM 25*a* samples the data traffic traversing the WSBS 25 and forwards the data traffic to the FWGWM 25*f* (4). The FWGWM 25*f* locates the appropriate FWaaS 45 in the 5G network 40 based on the policy created for the anomaly traffic (5*a*) and forwards the traffic via the 5G base station and the NSI 44 assigned for the anomaly traffic to the selected FWaaS 45 in the 5G network (6*a*, 7*a*). The FWaaS 45 service forwards the packets to the IoT application 65 after packet inspection (not shown).

The anomaly traffic sampled by the DCPM 25*a* is temporarily stored for analysis by the SRAM 25*c* (5). The SRAM 25*c* retrieves the stored data and applies the anomaly classification model trained by the AWCOMS 15 to assess and classify the anomaly traffic according to the level of the security risk (6, 7). Based on the security risk level, the SRAM 25*c* may decide to update the policy for feature inspection by the FWaaS 45. In this case, the new policy is provided to the FWGWM 25*f* (9).

Upon receiving data from the WSN 20, the IoT application 65 may send a response back through the 5G network 40 (10). The response is transmitted by the 5G base station 48 to the WSBS 25 (11). The response in this case is assigned to the NSI 44 for the anomaly traffic. The FWGWM 25*f* at the WSBS 25 forwards the data to the DCPM 25*a* (12). The DCPM 25*a* sends the response to the CH node, which forwards the response via one or more downstream sensor nodes 30 to the IoT client along the special path for anomaly traffic (13-15).

After inspecting the IoT traffic for a certain period, the FWaaS 45 in the 5G network 40 will clean up the warning for anomaly IoT traffic previously identified if no security risk is found (16-18). In this case, the FWaaS 45 in the 5G network 40 sends a request to remove the special path back through the 5G network 40, which is received at the 5G base station 48 (16). The request is transmitted by the 5G base station 48 to the WSBS 25 (17). The FWGWM 25*f* at the WSBS 25 forwards the request to the SRAM 25*c* (18). The SRAM 25*c* triggers the ASRMM 25*d* to remove the special path for anomaly traffic by sending a "re-arrange the security resource instruction" (19). This leads ASRMM 25*d* to remove the special path and optimize the usage of all the network elements within its WSN 20 (20). As previously noted, the ASRMM 25*d* applies a cost function to determine a new network topology that maximizes the efficiency of network communication. The ASRMM 25*d* sends the new network configuration to each CH node, which forwards the configuration to downstream sensor nodes 30 (21, 22). Each sensor node 30 loads the new configuration received from WSBS 25 to adapt the new network topology proposed by AI/ML model used by the ASRMM 25*d*.

In case that anomaly traffic is considered to be real security risk, the FWaaS 45 in the 5G network 40 sends an instruction to the SRAM 25c to block the WSN 20 access for the IoT devices that are the source of the anomaly traffic. This also triggers SRAM 25c to adapt its network topology to remove the special path as previously described.

Figure 10:
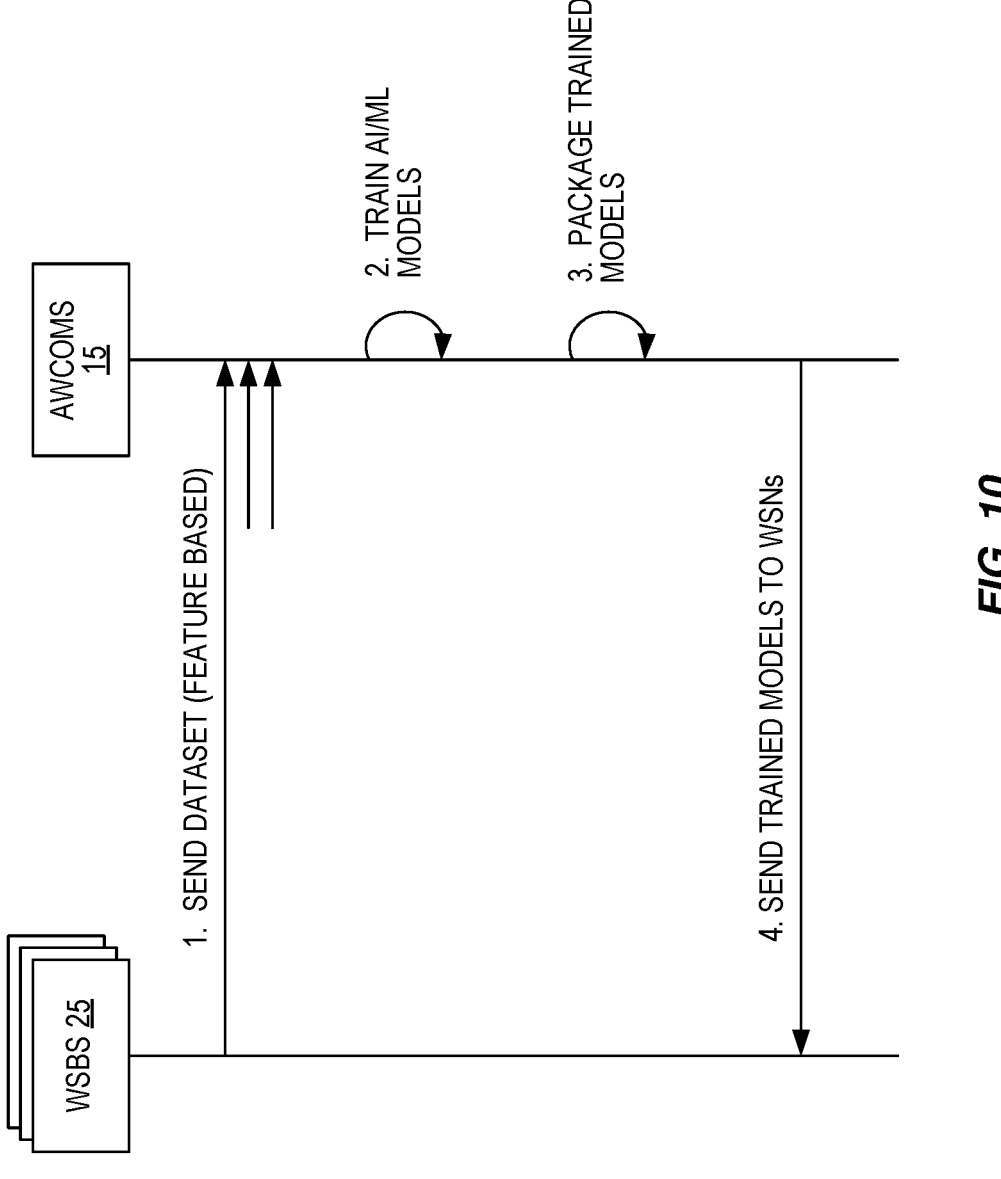
FIG. 10 illustrates signaling involved in the training and distribution of AI/ML models.

FIG. 10 illustrates signaling involved in the training and distribution of AI/ML models. The WSBSs 25 sends a "feature dataset" to AWCOMS 15 (1). The AWCOMS 15 trains the models for detection, classification and prediction (2). After the AI/ML algorithm converges, AWCOMS 15 packages the trained AI/ML models and delivers the trained models for detection and classification to the WSBS (3, 4). The AI/ML based prediction model is used by the AWCOMS 15 to determine where the potential security risks is expected to increase in the near future.

Figure 11:
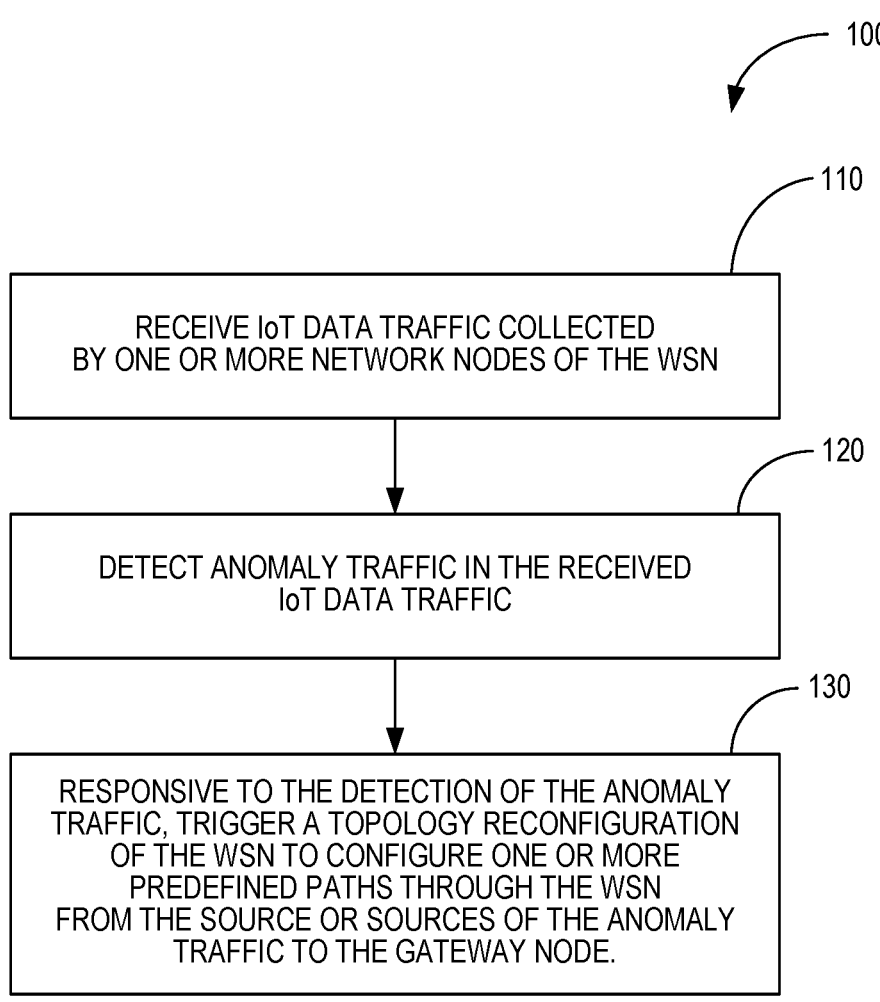
FIG. 11 illustrates an exemplary method of reconfiguring a WSN responsive to detection of anomaly traffic.

FIG. 11 illustrates a method 100 implemented by a network node in a wireless sensor network (WSN) of reconfiguring a WSN 20 responsive to detection of anomaly traffic. The network node may, for example, comprise a WSBS. The WSBS 25 receives data traffic from client devices collected by one or more network nodes of the WSN 20 (block 110). The WSBS 25 further detects anomaly traffic in the received data traffic (block 120). Responsive to the detection of the anomaly traffic, the WSBS 25 triggers a topology reconfiguration of the WSN 20 to configure one or more predefined paths through the WSN 20 from the source or sources of the anomaly traffic to the WSBS.

In some embodiments of the method 100, configuring one or more predefined paths through the WSN 20 for the anomaly traffic comprises configuring the WSN 20 to route anomaly traffic originating from client devices through one or more selected cluster heads in the WSN.

Some embodiments of the method 100 further comprise receiving anomaly traffic over the predefined path through the WSN.

Some embodiments of the method 100 further comprise creating or updating, responsive to the detection of the anomaly data traffic, a forwarding policy for forwarding the anomaly traffic to the IoT server over the backbone network.

In some embodiments of the method 100, creating or updating a forwarding policy for forwarding anomaly traffic comprises classifying the anomaly traffic to determine a risk level of the anomaly traffic, locating a firewall service provided by the backbone network for the anomaly traffic based on the risk level, and assigning the anomaly traffic to the firewall service determined on the basis of the risk level.

Some embodiments of the method 100 further comprise forwarding anomaly traffic to the assigned firewall service.

Some embodiments of the method 100 further comprise receiving an indication that the anomaly traffic is no longer a risk, and responsive to the indication, reconfiguring the WSN 20 to remove the predefined path for the anomaly traffic.

In some embodiments of the method 100, receiving an indication that the anomaly traffic is no longer a risk comprises receiving the indication from the assigned firewall service.

Some embodiments of the method 100 further comprise forwarding the anomaly traffic toward the IoT platform over a first network slice instance (NSI) configured for the anomaly traffic and forwarding normal traffic toward the IoT platform over a second NSI 44 different than the first NSI.

Figure 12:
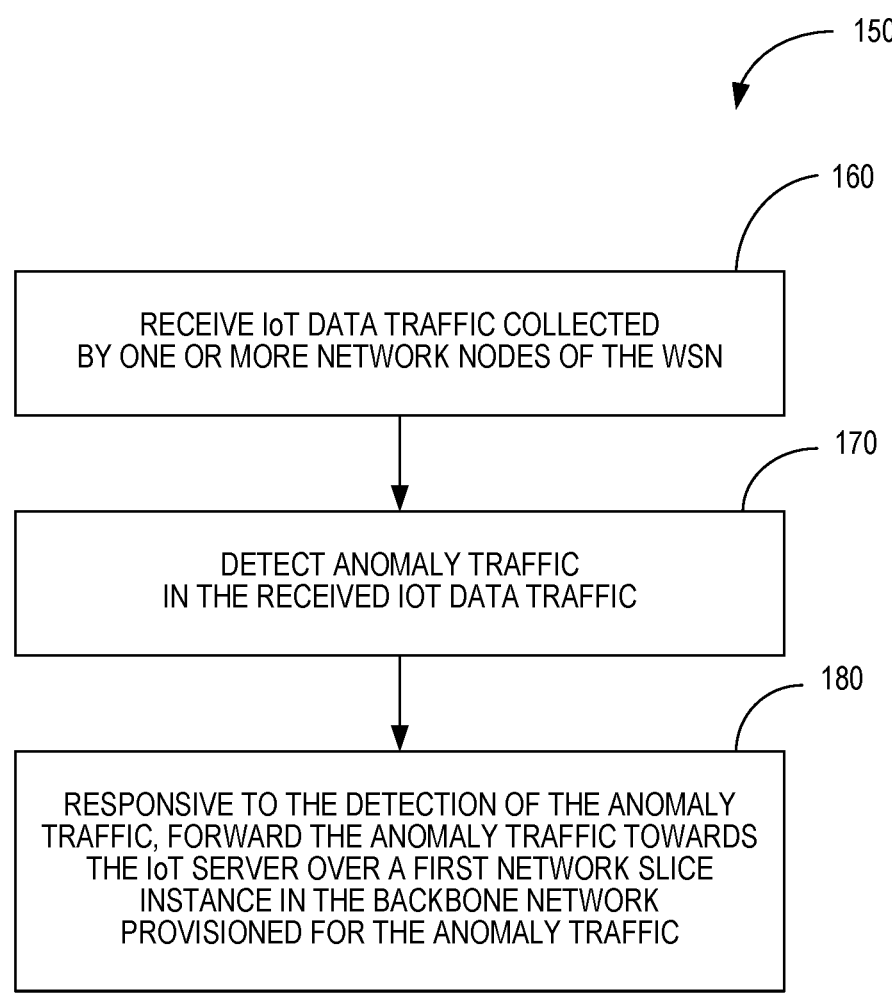
FIG. 12 illustrates an exemplary method of updating a security policy responsive to detection of anomaly traffic.

FIG. 12 illustrates a method 150 implemented by a network node in a wireless sensor network (WSN) of updating a security policy responsive to detection of anomaly traffic. The network node may, for example comprise a WSBS. The WSBS 25 receives IoT data traffic collected by one or more network nodes of the WSN 20 (block 160). The WSBS 25 further detects anomaly traffic in the received IoT data traffic (block 170). Responsive to the detection of the anomaly traffic, the WSBS 25 forwards the anomaly traffic towards the IoT server over a first network slice instance in the backbone network provisioned for the anomaly traffic (block 180).

Some embodiments of the method 150 further comprise forwarding normal data traffic in the received data traffic towards the IoT platform over a second network slice instance provisioned for the normal traffic.

Some embodiments of the method 150 further comprise creating or updating, responsive to the detection of the anomaly data traffic, a forwarding policy for forwarding the anomaly traffic to the IoT server over the backbone network.

In some embodiments of the method 150, creating or updating a forwarding policy for forwarding anomaly traffic comprises classifying the anomaly traffic to determine a risk level of the anomaly traffic, locating a firewall service provided by the backbone network for the anomaly traffic based on the risk level, and assigning the anomaly traffic to the firewall service.

Some embodiments of the method 150 further comprise triggering, responsive to the detection of the anomaly traffic, a topology reconfiguration of the WSN 20 to configure one or more predefined paths through the WSN 20 from the source or sources of the anomaly traffic to the gateway node.

Some embodiments of the method 150 wherein configuring one or more predefined paths through the WSN 20 for the anomaly traffic comprises configuring the WSN 20 to route anomaly traffic originating from client devices through one or more selected cluster heads in the WSN.

Figure 13:
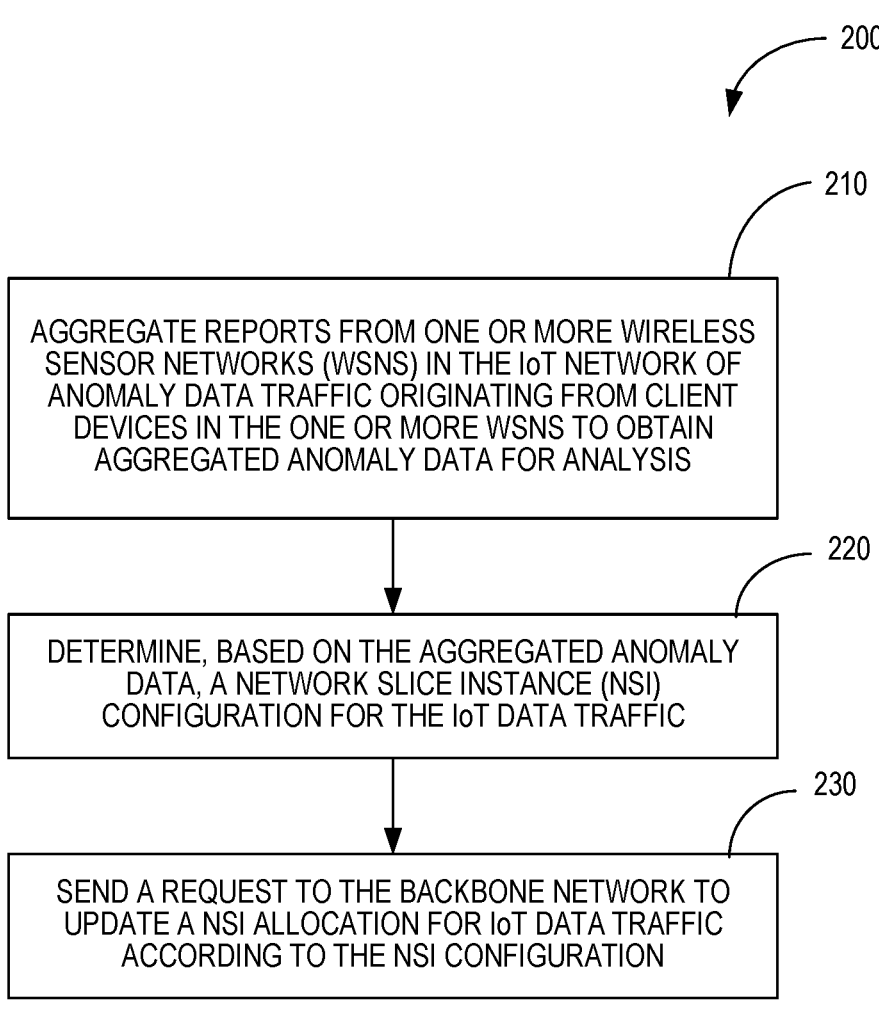
FIG. 13 illustrates an exemplary method of updated a Network Slicing Instance (NSI) allocation.

FIG. 13 illustrates a method 200 implemented by a network node in an Internet-of-Things (IoT) network of updating a NSI 44 allocation for IoT traffic. The network node may, for example, comprise a AWCOMS 15. The AWCOMS 15 aggregates reports from one or more wireless sensor networks (WSNs 20) in the IoT network 10 of anomaly data traffic originating from client devices in the one or more WSNs 20 to obtain aggregated anomaly data for analysis (block 210). The AWCOMS 15 further determines, based on the aggregated anomaly data, a network slice instance (NSI) configuration for the IoT data traffic (block 220). The AWCOMS 15 sends a request to the backbone network to update a NSI 44 allocation for IoT data traffic according to the NSI 44 configuration.

In some embodiments of the method 200, determining a NSI 44 configuration for the IoT data traffic comprises determining a NSI 44 configuration to segregate anomaly data traffic from normal data traffic.

In some embodiments of the method 200, the NSI 44 configuration comprises a dedicated NSI 44 for the anomaly traffic.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 14:
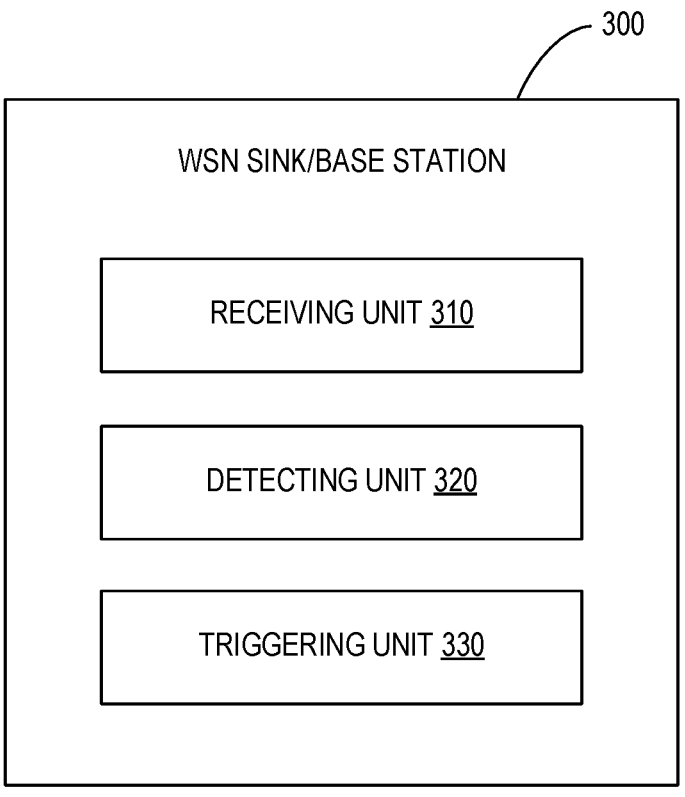
FIG. 14 illustrates a network node configured to reduce security risks responsive to detection of anomaly traffic in the WSN.

FIG. 14 illustrates a network node 300 in accordance with one or more embodiments. The network node 300 comprises a receiving unit 310, a detection unit 320 and a triggering unit 330. The various units 310-330 can be implemented by hardware and/or by software code that is executed by a processor or processing circuit. The receiving unit 310 is configured to receive data traffic from client devices collected by one or more network nodes of the WSN. The detecting unit 320 is configured to detect anomaly traffic in the received data traffic. The triggering unit 330 is configured to, responsive to the detection of the anomaly traffic, trigger a topology reconfiguration of the WSN 20 to configure one or more predefined paths through the WSN 20 from the source or sources of the anomaly traffic to the WSBS.

Figure 15:
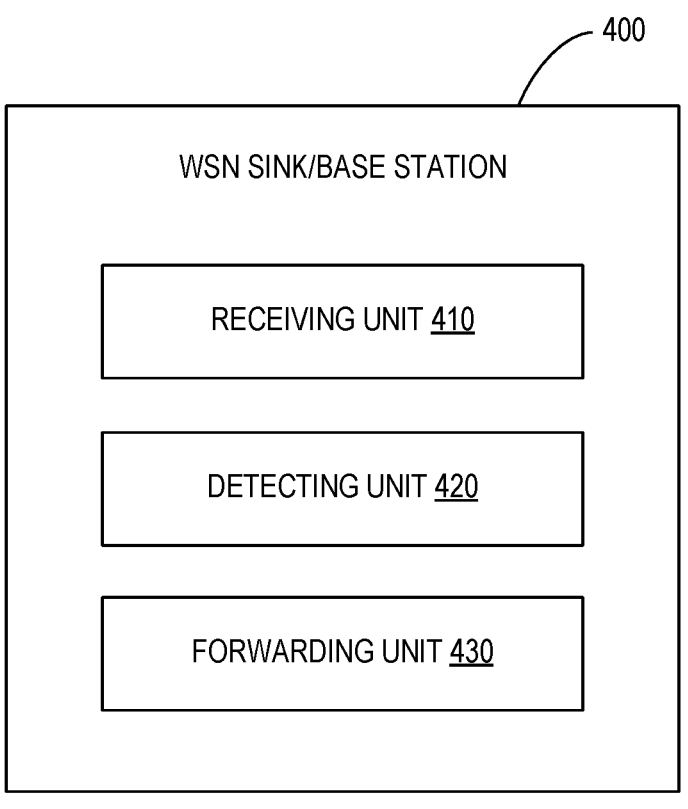
FIG. 15 illustrates a network node configured to forward data traffic collected by client devices toward an Internet of Things (IoT) server over a backbone network.

FIG. 15 illustrates a network node 400 in accordance with one or more embodiments. The network node 400 comprises a receiving unit 410, a detection unit 420 and a forwarding unit 430. The various units 410-430 can be implemented by hardware and/or by software code that is executed by a processor or processing circuit. The receiving unit 410 is configured to receive data traffic from client devices collected by one or more network nodes of the WSN. The detecting unit 420 is configured to detect anomaly traffic in the received data traffic. The forwarding unit 430 is configured to, responsive to the detection of the anomaly traffic, forward the anomaly traffic towards the IoT server over a first network slice instance in the backbone network provisioned for the anomaly traffic.

Figure 16:
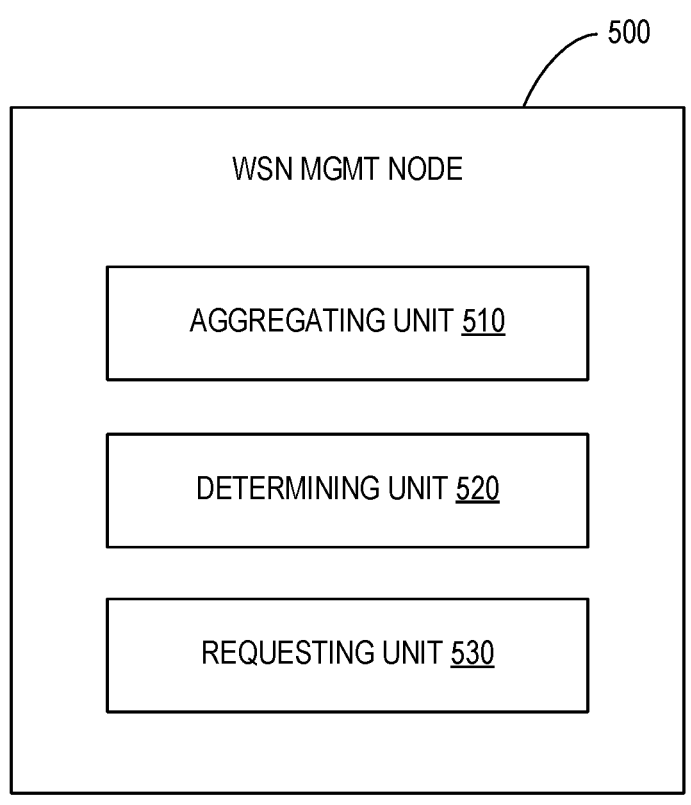
FIG. 16 illustrates a network node configured to allocate network resources for IoT traffic.

FIG. 16 illustrates a network node 500 in accordance with one or more embodiments. The network node 500 comprises an aggregating unit 510, a determining unit 520 and a requesting unit 530. The various units 510-530 can be implemented by hardware and/or by software code that is executed by a processor or processing circuit. The aggregating unit 510 is configured to aggregate reports from one or more wireless sensor networks (WSNs 20) in the IoT network 10 of anomaly data traffic originating from client devices in the one or more WSNs 20 to obtain aggregated anomaly data for analysis. The determining unit 520 is configured to determine, based on the aggregated anomaly data, a network slice instance (NSI) configuration for the IoT data traffic. The requesting unit 530 is configured to send a request to the backbone network to update a NSI 44 allocation for IoT data traffic according to the NSI 44 configuration.

Figure 17:
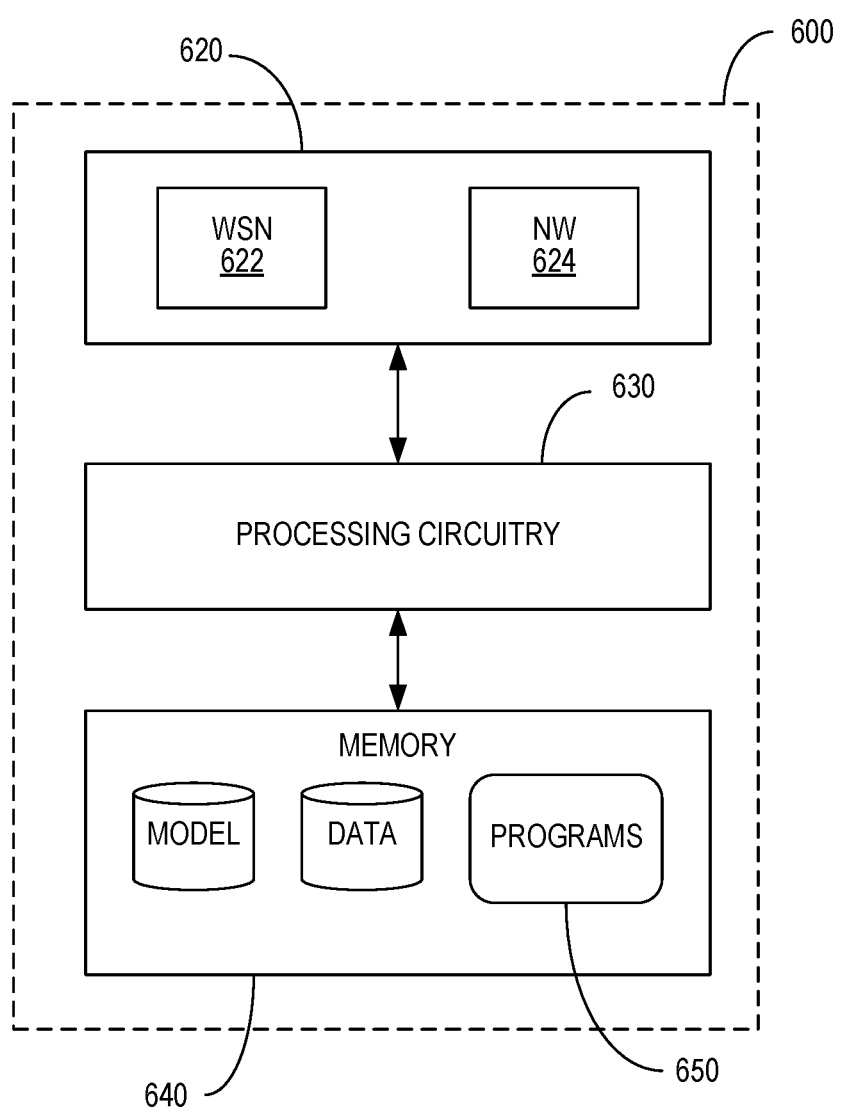
FIG. 17 illustrates a network node configured to implement the security techniques herein described.

FIG. 17 illustrates the main functional components of a network node 600 according to one embodiment that may be configured to function as a WSBS 25 or AWCOMS 15 as herein described. The network node 600 comprises communication circuitry 620, a processing circuitry 630, and memory 640.

In the case of a WSBS, the communication circuitry 620 comprises a WSN 20 interface circuitry 622 for communication between network nodes within the WSN 20 and network interface circuitry 624 for communication with the AWCOMS 15 and IoT servers over the 5G network. In one embodiment, the WSN 20 interface circuitry comprises a RF circuitry for communication between network nodes within the WSN 20 over a RF channel. The network interface circuitry 624 comprises circuitry for communication with the IoT servers and AWCOMS 15 over the 5G network 40 or other backbone network. The WSN 20 interface circuitry 624 may comprise wired or wireless interfaces. In the case of a WSBS, the communication circuitry 620 comprises a network interface circuitry 624 for communication with the WSBSs 25 over the 5G network 40 and with the 5GC to manage the resources of the IoT network.

The processing circuitry 630 controls the overall operation of the network node 600 and implements the methods as herein described. The processing circuitry 630 may comprise one or more microprocessors, hardware, firmware, or a combination thereof. In one embodiment, the processing circuitry 630 is configured to perform one or more of the methods shown in FIGS. 11 and 12. In other embodiments, the processing circuitry 630 is configured to perform one or more of the methods shown in FIG. 13.

Memory 640 comprises both volatile and non-volatile memory for storing computer program code and data needed by the processing circuit 630 for operation. Memory 640 may comprise any tangible, non-transitory computer-readable storage medium for storing data including electronic, magnetic, optical, electromagnetic, or semiconductor data storage. Memory 640 stores computer program 650 comprising executable instructions that configure the processing circuitry 630 to implement the methods according to FIGS. 11-13 as described herein. A computer program 650 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 650 for configuring the processing circuitry 630 as herein described may be stored in a removable memory, such as a portable compact disc, portable digital video disc, or other removable media. The computer program 650 may also be embodied in a carrier such as an electronic signal, optical signal, radio signal, or computer readable storage medium.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

What is claimed is:

1. A method implemented by a network node in a wireless sensor network (WSN) of routing data traffic collected by client devices toward an Internet of Things (IoT) platform over a backbone network, the method comprising:

receiving data traffic from client devices collected by one or more network nodes of the WSN;

detecting anomaly traffic in the received data traffic; and responsive to the detection of the anomaly traffic, triggering a topology reconfiguration of the WSN to configure one or more predefined paths through the WSN from the source or sources of the anomaly traffic to the network node.

2. The method of claim 1, wherein configuring one or more predefined paths through the WSN for the anomaly traffic comprises configuring the WSN to route anomaly traffic originating from client devices through one or more selected cluster heads in the WSN.

3. The method of claim 2, further comprising receiving anomaly traffic over the predefined path through the WSN.

4. The method of claim 1, further comprising creating or updating, responsive to the detection of the anomaly data traffic, a forwarding policy for forwarding the anomaly traffic to the IoT server over the backbone network.

5. The method of claim 4, wherein creating or updating a forwarding policy for forwarding anomaly traffic comprises:

classifying the anomaly traffic to determine a risk level of the anomaly traffic; and locating a firewall service provided by the backbone network for the anomaly traffic based on the risk level; and assigning the anomaly traffic to the firewall service determined on the basis of the risk level.

6. The method of claim 5 further comprising forwarding anomaly traffic to the assigned firewall service.

7. The method of claim 1, further comprising:

receiving an indication that the anomaly traffic is no longer a risk; and responsive to the indication, reconfiguring the WSN to remove the predefined path for the anomaly traffic.

8. The method of claim 7 wherein receiving an indication that the anomaly traffic is no longer a risk comprises receiving the indication from the assigned firewall service.

9. The method of claim 8, further comprising:

forwarding the anomaly traffic toward the IoT platform over a first network slice instance (NSI) configured for the anomaly traffic; and forwarding normal traffic toward the IoT platform over a second NSI different than the first NSI.

10. A method implemented by a network node in a wireless sensor network (WSN) in an Internet-Of-Things (IoT) network of sending data traffic collected by client devices toward an Internet of Things (IoT) server over a backbone network, the method comprising:

receiving IoT data traffic collected by one or more network nodes of the WSN;

detecting anomaly traffic in the received IoT data traffic; and responsive to the detection of the anomaly traffic, forwarding the anomaly traffic towards the IoT server over a first network slice instance in the backbone network provisioned for the anomaly traffic.

11. The method of claim 10, further comprising forwarding normal data traffic in the received data traffic towards the IoT platform over a second network slice instance provisioned for the normal traffic.

12. The method of claim 10, further comprising creating or updating, responsive to the detection of the anomaly data traffic, a forwarding policy for forwarding the anomaly traffic to the IoT server over the backbone network.

13. The method of claim 12, wherein creating or updating a forwarding policy for forwarding anomaly traffic comprises:

classifying the anomaly traffic to determine a risk level of the anomaly traffic;

locating a firewall service provided by the backbone network for the anomaly traffic based on the risk level; and assigning the anomaly traffic to the firewall service.

14. The method of claim 10, further comprising triggering, responsive to the detection of the anomaly traffic, a topology reconfiguration of the WSN to configure one or more predefined paths through the WSN from the source or sources of the anomaly traffic to the gateway node.

15. The method of claim 14, wherein configuring one or more predefined paths through the WSN for the anomaly traffic comprises configuring the WSN to route anomaly traffic originating from client devices through one or more selected cluster heads in the WSN.

16. A network node in a wireless sensor network (WSN) configured to route data traffic collected by client devices toward an Internet of Things (IoT) server over a backbone network, the network node comprising:

communication circuitry enabling communication with other network nodes in the WSN;

processing circuitry configured to:

receive data traffic from client devices collected by one or more network nodes of the WSN;

detect anomaly traffic in the received data traffic;

responsive to the detection of the anomaly traffic, trigger a topology reconfiguration of the WSN to configure one or more predefined paths through the WSN from the source or sources of the anomaly traffic to the network node.

17. A network node in a wireless sensor network (WSN) configured to send data traffic collected by client devices toward an Internet of Things (IoT) server over a backbone network, the network node comprising:

communication circuitry enabling communication with other network nodes in the WSN;

processing circuitry configured to:

receive IoT data traffic collected by one or more network nodes of the WSN;

detect anomaly traffic in the received IoT data traffic; and responsive to the detection of the anomaly traffic, forward the anomaly traffic towards the IoT server over a first network slice instance in the backbone network provisioned for the anomaly traffic.

* * * * *